Patented Apr. 29, 1930

1,756,049

UNITED STATES PATENT OFFICE

FRITZ WÜST, OF DUSSELDORF, GERMANY, ASSIGNOR TO THE FIRM TH. GOLDSCHMIDT A.-G., OF ESSEN, GERMANY

METHOD OF UTILIZING BUNDLED SCRAP METAL

No Drawing. Application filed August 19, 1926, Serial No. 130,357, and in Germany September 2, 1925.

Metal scrap such as for example scrap iron is often reutilized by packing same into bundles and charging such bundles into a smelting furnace such as for example a cupola furnace or Martin furnace, in order to regenerate the metal together with the fused material in the furnace. Such metal is also, when dealing for example with wrought iron scrap, likewise pressed into bundles and heated in coal or coke fires to the welding temperature, in order thereupon to be welded together by hammering, pressing, rolling and the like to produce new wrought iron.

The present invention aims at making such scrap bundles useful again in a different manner. According to the invention there are produced in the bundled scrap metal electrical eddy currents which are adapted to bring the bundles to such a high temperature that the material is capable of being welded.

If for example, one or more scrap iron bundles are surrounded by a copper ring or copper shell around which a suitable alternating current is conducted, eddy currents are produced in the scrap bundles. These eddy currents heat the parcel from the inside without necessitating any supply of external heat. The heat continuously increases, and red heat is gradually produced until bright white heat can finally be observed at which the bundle is at a welding temperature. All that is thereupon necessary is to hammer, press or roll the metal in order to produce therefrom wrought iron or rolled iron objects.

What I claim is:

1. Method of treating bundled scrap metal, which consists in heating the metal bundles by electrical eddy currents to welding temperature and thereupon welding same into a homogeneous mass.

2. Method of treating bundled scrap metal, which consists in surrounding one or more scrap bundles with a copper ring, passing a suitable alternating current through said ring to induce eddy currents in the scrap to heat the latter to welding temperature, and consolidating the scrap into a homogeneous mass.

3. Method of treating bundled scrap metal, which consists in surrounding one or more scrap bundles with an electric conductor and passing a suitable alternating current through said conductor to induce eddy currents in the scrap to heat the latter to welding temperature, and consolidating the scrap into a homogeneous mass.

In testimony whereof I affix my signature.

FRITZ WÜST.